United States Patent
Beck et al.

(10) Patent No.: US 6,778,894 B2
(45) Date of Patent: Aug. 17, 2004

(54) MONITORING DEVICE FOR A WORKING VEHICLE

(75) Inventors: Folker Beck, Bettendorf, IA (US); Lutz Bischoff, Dellfeld (DE)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 10/039,646

(22) Filed: Jan. 7, 2002

(65) Prior Publication Data

US 2002/0107625 A1 Aug. 8, 2002

(30) Foreign Application Priority Data

Jan. 8, 2001 (DE) .......................................... 101 00 522

(51) Int. Cl.$^7$ ............................................... G01M 7/00
(52) U.S. Cl. ........................................ 701/50; 701/29
(58) Field of Search ................................ 701/1, 29, 30, 701/50, 34–36; 56/10.2 J

(56) References Cited

U.S. PATENT DOCUMENTS

| | | | |
|---|---|---|---|
| 4,056,817 A | | 11/1977 | Bachman .................. 340/253 |
| 4,353,199 A | * | 10/1982 | Chow et al. ................. 460/2 |
| 4,376,298 A | | 3/1983 | Sokol et al. ............... 364/551 |
| 4,574,633 A | | 3/1986 | Ohnuki et al. .............. 73/587 |
| 4,720,962 A | * | 1/1988 | Klinner ................... 56/10.2 R |
| 5,893,892 A | * | 4/1999 | Loeffler ....................... 701/29 |
| 5,955,674 A | * | 9/1999 | McGovern et al. ........... 73/650 |
| 5,978,720 A | * | 11/1999 | Hieronymus et al. ......... 701/29 |
| 6,004,017 A | * | 12/1999 | Madhavan ................... 701/29 |
| 6,266,586 B1 | * | 7/2001 | Gagnon ........................ 701/29 |
| 6,269,618 B1 | * | 8/2001 | Digman et al. ........... 56/10.2 J |
| 6,298,641 B1 | * | 10/2001 | Digman et al. ........... 56/10.2 J |
| 6,430,903 B1 | * | 8/2002 | Christiansen et al. ..... 56/10.2 J |

FOREIGN PATENT DOCUMENTS

| | | |
|---|---|---|
| BG | 33743 | 5/1983 |
| DE | 25 05 369 | 10/1975 |
| DE | 39 07 419 A1 | 9/1990 |
| DE | 42 23 161 A1 | 1/1994 |
| DE | 196 26 669 C1 | 7/1996 |
| DE | 197 54 918 A1 | 6/1998 |
| DE | 694 21 393 T2 | 10/1999 |
| DE | 198 26 422 A1 | 12/1999 |
| EP | 1 044 596 A2 | 10/2000 |
| FR | 2 040 361 | 4/1970 |

OTHER PUBLICATIONS

Database WPI Section PQ, Week 199216 Derwent Publications Ltd., London, GB; Class P12, AN 1992–130335 XP002195670 & SU 1 662 403 A (Penza Agric Inst), Jul. 15, 1991.

Database WPI Section PQ, Week 198412 Derwent Publications Ltd., London, GB; Class P12, AN 1984–093300 XP002195671 & SU 1 020 047A (Lengd Agric Inst), May 30, 1983.

* cited by examiner

Primary Examiner—William A. Cuchlinski, Jr.
Assistant Examiner—Eric M. Gibson

(57) ABSTRACT

A monitoring device for monitoring the function of an agricultural working machine comprises at least one sensor that is designed for generating a sensed signal containing information on noise caused by at least one movable element of the working machine. A computer receives the sensed signal of the sensor and generates an output signal value based on the sensed signal delivered by the sensor and a comparative value. Defect messages can be generated to alert the operator of a defect condition.

16 Claims, 2 Drawing Sheets

MONITORING DEVICE FOR A WORKING VEHICLE

FIELD OF THE INVENTION

The present invention is directed to a monitoring device for monitoring the performance of an agricultural working machine. The monitoring device contains at least one sensor that is designed for generating a signal containing information on the noise caused by at least one movable element of the working machine.

BACKGROUND OF THE INVENTION

Agricultural machines are increasingly equipped with elaborate soundproof cabs in order to protect the operator from environmental influences. In such instances, it is attempted to provide the operator with information on the machine status in different ways, for example, in the form of warning indicators for rotational speeds and the hydraulic fluid pressure. Due to the sound insulation of the cab, the operator cannot perform the monitoring and control functions of the machine as well as with machines that have an open workstation, since the ability of the operator to perceive the source of noise caused by incorrectly operating parts of the machine is diminished.

DE 42 232 161 A describes a device for determining the parameters that cause natural vibrations. This device is intended as an aid in the design of rotating working members, for example, threshing or chopping drums. The drum to be examined is mounted in a rotary or translational vibrator and set in motion. Here, since the vibrational behavior of the drum is examined outside of the machine, the machine operator is not provided with any assistance in evaluating the performance of the machine.

BG 33 743 describes a device for physically/mechanically examining working elements of a grape picking machine. The vibrations of the device are detected and displayed on an oscilloscope.

It is also known to provide combine harvesters with vibration sensors that measure lost grain. The signals of the vibration sensors are evaluated and used for displaying the loss portion. However, this does not make it possible to monitor movable elements of the combine harvester.

SUMMARY

It is an object of the present invention to provide an improved device for monitoring the performance of an agricultural harvesting machine that makes it possible to detect defects in timely fashion.

An agricultural working machine is provided with a computer that receives a signal from at least one sensor containing information on the noise caused by the movement or vibration of an element of the working machine. The computer uses this signal and a comparative value in order to generate a signal value that contains information regarding whether or not the working machine is operating correctly.

Although damage in the early stages does not impair the performance of the components and consequently cannot be detected by conventionally provided sensor arrangements, damage of this type can frequently be recognized in the form of unusual noise. A sensitive ear can discriminate scratching, cracking, pinging, whistling, humming or droning noises from the normal noise spectrum of the machine. These noises are caused by the improper guidance of the damaged parts or even their deviation from their moving paths. This can lead to undesirable vibrations of the components, wherein various subassemblies may also disadvantageously rub against one another or impact one another, causing the components and subassemblies to vibrate. It is also possible that components which are not directly mechanically connected to the damaged part may have sympathetic vibrations.

The monitoring device replaces the ear of the operator located in the soundproof cab. It is possible to gain information on wear or cracks, insufficient lubrication of bearings, defective bearings, fractures or deformations of components, lost or fractured screw connections, welding connections or similar connections, as well as imbalances in the moving elements of the working machine, at a very early stage. Loosening connections, e.g., nuts and bolts, result in changes in the vibrational behavior, wherein corresponding measures can be initiated based on the signal value generated by the computer before severe damage occurs.

It would be conceivable to utilize the signal of the sensor and the comparative value for generating a signal value; however, it is preferred to reduce the required computing capacity of computer by deriving a parameter from the sensor signal that serves for generating the signal value together with the comparative value. It is preferred to carry out a comparison between the signal (or a parameter derived therefrom) and the comparative value. However, other mathematical operations may also be used for generating the signal value.

The sensor is preferably arranged in such a way that it senses the noise produced by the movement and/or vibration of a driven element of the working machine. The sensor consequently may directly cooperate with the driven element and sense its noise in any given fashion, for example, mechanically, optically or inductively. The driven element preferably consists of a material conveying element and/or a material processing element, e.g., a chopping drum or threshing cylinder. This sensor or another sensor may alternatively or additionally sense the noise produced by a driven or non-driven element, e.g., the cleaning shoe, a side wall of the combine harvester or a supporting element. In case of a defect, such an element produces different noise than in the normal operating mode, wherein said noise can be detected by the sensor.

Since the transmission of acoustic vibrations is closely related to mechanical vibrations, any type of sensor or sensors may be used for directly or indirectly recording the signal and that is able to sense sound conducted through solids, sound transmitted by air, mechanical vibrations or any other physical variables that are directly or indirectly associated with these vibrations, for example, one-dimensional or multi-dimensional acceleration sensors, acoustic microphones for sound conducted through solids and/or acoustic microphones for sounds transmitted by air. Consequently, it is preferred to utilize an acoustic sensor (microphone) or a motion sensor (vibration sensor, e.g., acoustic sensor for sounds conducted through solids) which delivers information on the acceleration acting upon the sensor or its speed or position. However, all types of sensors for compressive stresses and/or tensile stresses and/or vibrations may be utilized.

In order to monitor the individual moving parts of the machine, it would be appropriate to equip all these elements with suitable sensors and control devices. Although this would be possible, it would certainly represent a quite significant technical expenditure. The best results can be achieved if a series of sensors are arranged in the vicinity of bearing points of the most critical and/or most important subassemblies. However, the number of sensors should be kept to a minimum in order to reduce the expenditure. Favorable positions for arranging these sensors are nodal points at which the forces of as many movable subassemblies to be monitored as possible converge, for example, nodes in the support system of the frame. An acoustic microphone for sounds transmitted by air may also be arranged in a central region. Several microphones could also be distributed over the machine (e.g., front left, front right, rear left, rear right). The precise positioning of the sensors or the sensor cannot be generally specified because it depends on the respective structure of the machine and must be individually determined for each machine type.

Consequently, the sensor can be arranged on the working machine such that it is separated from the element to be monitored, wherein the acoustic vibration of the element is acoustically or mechanically transmitted to the sensor, for example, by the chassis or other parts of the working machine that support the element to be monitored or are directly or indirectly mechanically connected thereto.

The computer is preferably designed such that it delivers a defect message if the sensor signal indicates a defect in the working machine. A defect message can be generated if a parameter derived from the sensor signal lies outside a certain range around the comparative value of the parameter, in particular, if the deviation is greater than a threshold value. In particular, the parameter consists of the frequency and/or amplitude of vibration. This means that a defect signal is generated not only if a vibration is stronger than expected by a first threshold value, but also if the vibration is weaker by a second (which, if need be, is different from the first) threshold value, since an excessively weak vibration sensed by the sensor may also contain information on a defect. Due to these measures, it is possible to also detect a shift in the natural frequencies of components or subassemblies which result from a changed, defective components structure.

Instead of calculating only one or more discrete parameters and carrying out a comparison with the comparative value or values, it is also possible to compare information on the movement of the element which was recorded over a certain time or a frequency spectrum calculated by means of Fourier analysis with a comparative value. A defect message is generated if the information on the movement or the frequency spectrum deviates from the comparative value.

The comparative values need not necessarily consist of the values of a flawlessly operating working machine because it would also be conceivable to store values that correspond to a working machine with a known defect. In this case, a defect can be easily identified. Naturally, it is also possible to compare the values measured by the sensor (or parameters derived therefrom) with several comparative values that correspond to working machines with known defects.

Although a defect message—which is not specified in detail in this context—may be helpful in preventing damage to the working machine, it would be desirable in many instances to obtain information regarding which location the defect has occurred. Consequently, the invention proposes that the computer be designed such that it is able to assign the signal delivered by at least one sensor to one element of the working machine. The assignment of a signal to an element can be realized in different ways.

The respective element can be determined based on the position of a sensor if the latter is designed for measuring the movement of only one element. For example, a suitable motion sensor may sense the movement of only one rotary conveyor or one material processing drum.

The signal of a sensor can also be assigned to an element if its moving frequency and/or amplitude is approximately known. Based on the frequency or amplitude of a signal portion, the computer determines its source and assigns this signal portion to the respective element. In case of a defect, the element can be easily detected and displayed.

Such an assignment of a vibration to a movable element is particularly problematic if several elements operate with approximately identical rotational speeds and/or moving amplitudes. In such instances, it is proposed to assign a rotational speed sensor to the element which senses the rotational frequency of the element. Rotational speed sensors of this type are considered standard equipment in modern working machines for carrying out electronic measurements on important components. This means that the data bus is already able to read part of the required information. Based on this information, the rotational speeds or moving frequencies of all preceding and subsequent movable subassemblies can be calculated by means of the known transmission ratios in the entire drive system. The slip may also be taken into consideration in this calculation. If so required, additional rotational speed sensors may or must be installed. The signal of the rotational speed sensor is fed to the computer that assigns the signal portions of the motion and/or vibration sensor which are related to the rotational frequency measured by the rotational speed sensor to the element.

It would also be conceivable to compare the measured parameter with one or more parameters that correspond to working machines with certain defects, i.e., to utilize the value of a defective machine as the comparative value. For example, it would be possible to compare a stored parameter that was measured on a defective bearing with the measured parameter such that a defective bearing can be easily detected. In embodiments in which a movement or frequency spectrum that is measured over a certain time is compared with a comparative value, it is also possible to carry out a comparison with comparative values that correspond to machines with certain defects. This would make it possible to detect the defect easily and rapidly.

After the computer has determined to which element of the working machine a defect can be assigned, a corresponding defect message is generated, preferably on a display device. In this case, the defective element is displayed to the operator, e.g., in the form of pictographs, acoustic signals or graphic characters.

Even if the reason for the defect cannot always be pinpointed, it is possible at least to inform the operator of the defect. A simple defect display could be supplemented with an on-line help menu that suggests to the operator, based on the automatically received information possible sources of the defect and various steps for locating the defect, and, if so required, repair assistance. This principle, transferred from handbooks to the on-board computer, could also broaden the boundaries of an automatic defect localization and significantly simplify the defect detection the operator.

The comparative value of the signal (or a parameter of the signal) can be stored, e.g., in a ROM. Since the noise produced by a working machine may change over time and frequently also depends on the type of material being processed, a static comparative value may lead to incorrect defect messages. New machines are not identical when they leave the assembly line. Dimensional tolerances of components, tolerances on torques for bolted connections, material tolerances and various other factors cause differences in the nominal noise of a new machine. Consequently, it is preferred to record the signals of the sensors while a machine (in particular, the machine in question) operates flawlessly, at the beginning of a working process, and to store these signals in memory that is connected to the computer as the comparative value. The computer may contain a neural network that is able autonomously to learn the spectrum of a flawlessly operating working machine. The sensors may also assist in the quality control that is carried out as part of the manufacturing process.

The monitoring device need not necessarily be constantly active in order to monitor the working machine for defects. It may suffice if the monitoring device occasionally analyzes the noise spectrum of the working machine, for example, when the machine is turned around at the end of a field. In this embodiment, the monitoring device may be connected to a (usually provided) device for determining the position of the working machine, for example, a GPS device.

The monitoring device may be used on any working machine with moving parts, in particular, on agricultural working machines. Examples in this respect are self-propelled working machines such as tractors, combine harvesters, field choppers and cotton-picking devices. However, the invention may also be utilized on towed or attached working machines, for example, on harvesting attachments such as harvesters, corn gatherers, or cutting mechanisms. Fertilizer spreaders and attached, towed or self-propelled spraying vehicles may also be equipped with this monitoring device.

DETAILED DESCRIPTION

Figure 1:
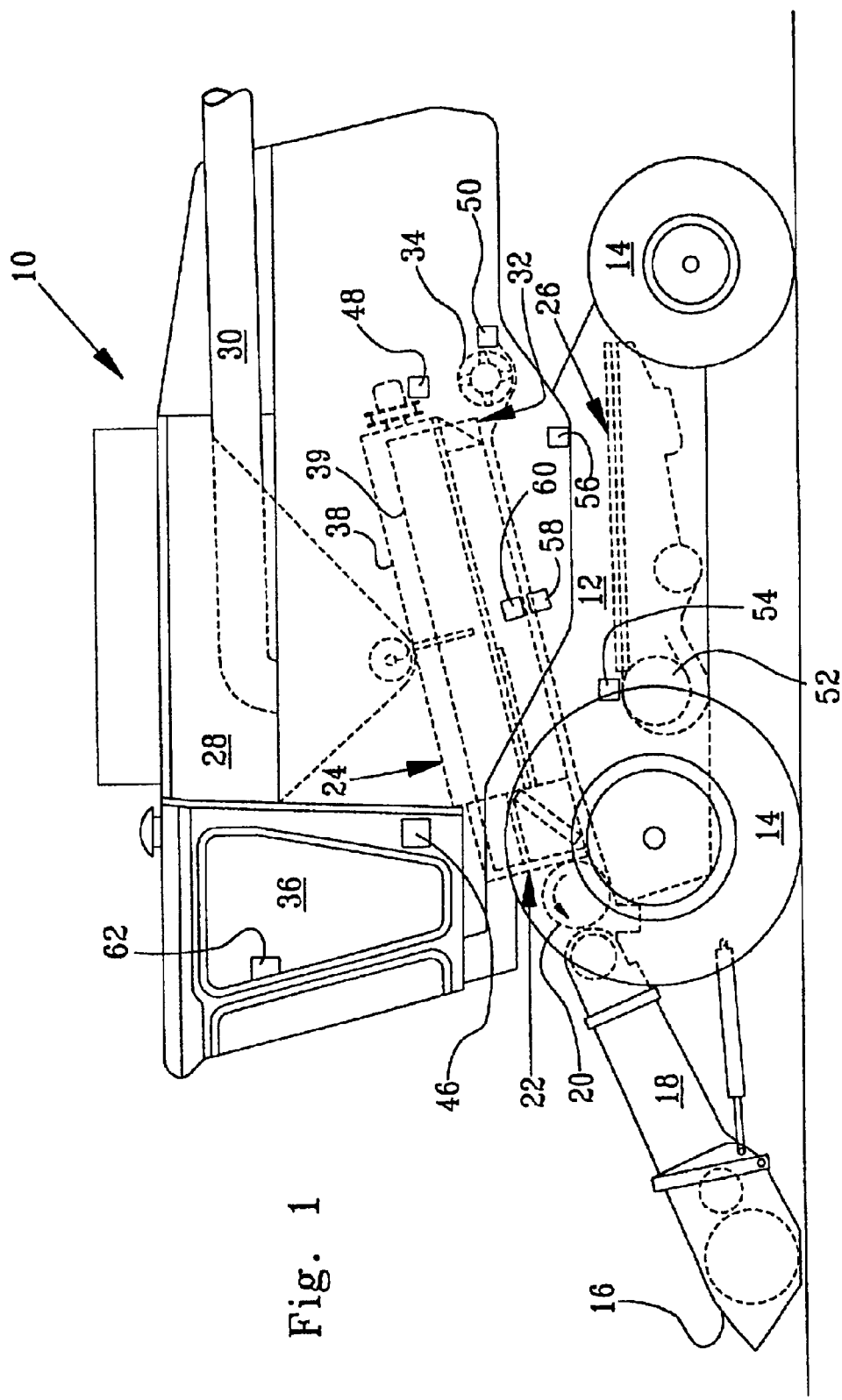
FIG. 1, a semi-schematic side view of an agricultural axial combine harvester.

FIG. 1 shows an agricultural combine harvester 10 with a frame 12 and ground engaging wheels 14, wherein this combine harvester serves as an example for elucidating the invention. A harvesting assembly comprising a harvesting platform 16 is used for harvesting a standing agricultural crop and conveying the harvested crop material to a feeder house 18. The feeder house is an inclined conveyor that conveys the harvested crop material to a transverse infeed beater 20. The infeed beater 20 conveys the harvested crop material upward to an axial separating device 24, through an inlet transition region 22.

The axial separating device 24 threshes and separates the harvested material. The axial separating device 24 comprises a cylindrical rotor housing 38 and a rotor 39 arranged in the rotor housing 38. Grain and chaff drop into a cleaning assembly 26 through grates on the bottom of the rotor housing 38. The cleaning assembly 26 removes the chaff and feeds the clean grain to a clean grain elevator, not shown. The clean grain elevator deposits the clean grain in a grain tank 28. The clean grain in the grain tank 28 can be unloaded into a trailer or truck by means of an unloading auger 30. Crop material other than grain is fed from the axial separating device 24 to a discharge beater 34 through an outlet 32. The discharge beater 34 ejects the straw out the rear of the combine harvester 10.

The combine harvester 10 is operated from an operator's cab 36. A computer 46 that is connected to various sensors is also arranged in the operator's cab 36.

A sensor 48 is arranged on the axial separating device 24 and senses vibrations of the rotor housing 38. A sensor 50 is mounted on the frame 12 in the vicinity of the discharge beater 34, this sensor senses the vibrations of the parts of the frame 12 which support the discharge beater 34. A sensor 54 is arranged on the frame 12 in the vicinity of a cleaning fan 52 of the cleaning assembly 26. A rotational speed sensor 58 inductively senses the rotational speed of the rotor 39 by means of a permanent magnet 60 arranged on the rotor 39. A sensor 56 is arranged on the frame 12 above the cleaning assembly 26. The sensors 48, 50, 54 and 56 comprise sensors that are designed for generating signals containing information on acoustic waves. In particular, the sensors may consist of acoustic sensors or acceleration sensors.

Due to its position, the sensor 48 primarily delivers information on the movement of the rotor housing 38 and consequently the vibrations caused by the rotating rotor 39. Analogously, the sensor 50 primarily delivers information on vibrations of the frame 12 which are caused by the discharge beater 34. The sensor 54 primarily delivers information on the vibrations caused by the cleaning fan 52. The sensor 56 delivers information on the vibrations of the chassis which are caused by all movable elements of the combine harvester 10.

The sensors 48, 50, 54, 56 and 58 are electrically (or optically) connected to the computer 46, preferably via a bus line. The computer 46 digitizes the analog signals of the sensors, evaluates said signals and generates a defect message for the operator on a display device 62 in the operator's cab 36 if a defect of the combine harvester 10 is detected based on the signals.

Figure 2:
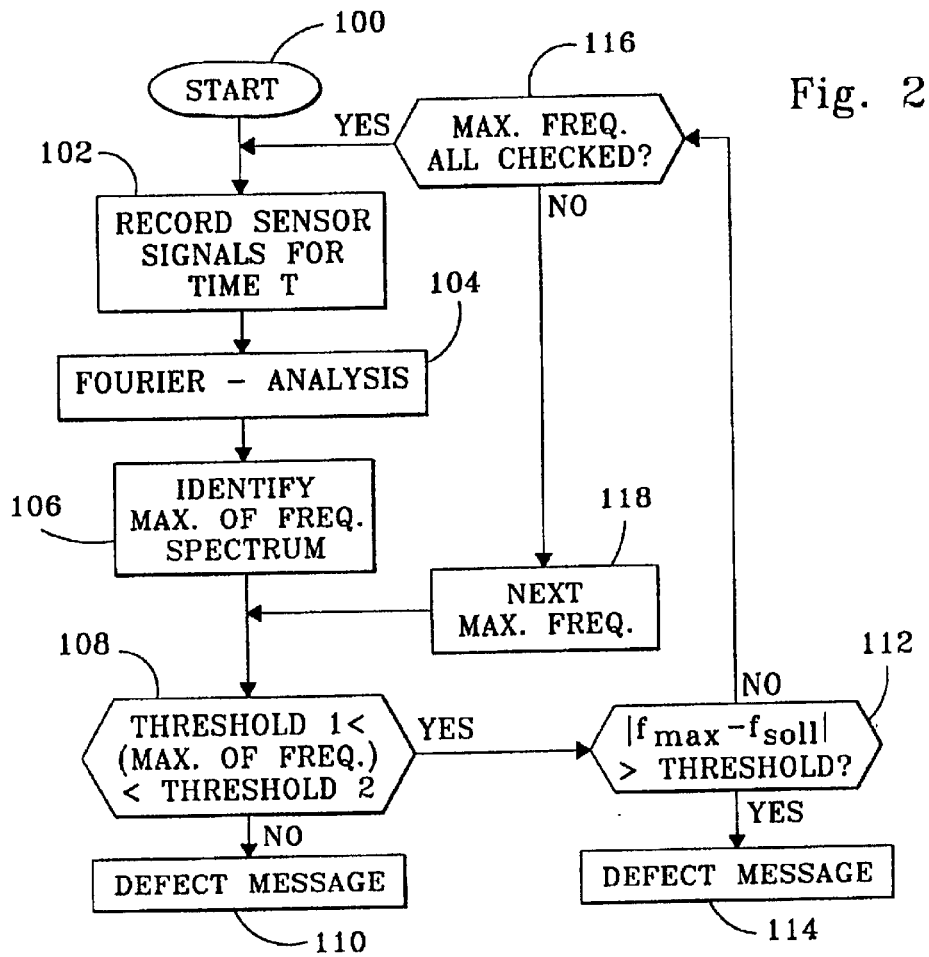
FIG. 2, a flow chart of the monitoring device of the combine harvester.
Figure 3:
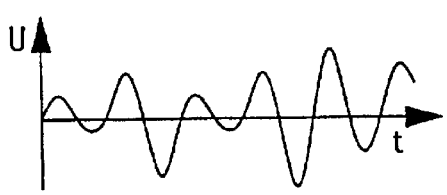
FIG. 3, an example of the signals recorded by a sensor.

One possible operating mode of the computer 46 is shown in FIG. 2. After the start in step 100, the signals of the sensors 48, 50, 54, 56 and 58 are recorded over a certain time T in step 102, for example, over 10 seconds. During this process, the voltage waveforms of the signals delivered by the sensors 48, 50, 54, 56 and 58 are stored by the computer as a function of time. This may result in the curve shown in FIG. 3, in which the sensor signal is plotted as a function of time.

In step 104, a frequency spectrum is calculated from the signal values delivered by the sensors 48, 50, 54, 56 and 58 by means of a Fourier analysis or transform. An amplitude value is assigned to different frequencies, wherein negative frequency values containing phase information are also possible. Such a frequency spectrum is illustrated in FIG. 4.

Figure 4:
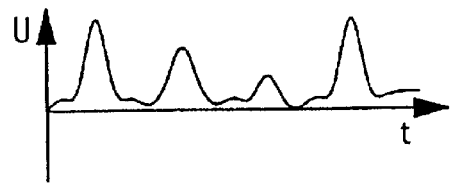
FIG. 4, an example of a frequency spectrum that is calculated from the signals shown in FIG. 3.

FIG. 4 indicates that amplitude maxima can be detected at certain frequencies. The width of the maxima usually is dependent on time T; the width decreases as T increases. The individual maxima can be assigned to the movements and/or vibrations of the elements of the combine harvester 10. The rotational frequency of the rotor 39 can be easily determined by the computer from the signals of the rotational speed sensor 58. This means that signals with components, the frequency of which is a multiple of the rotational frequency of the rotor 39, can be assigned to the rotor 39. The components can be assigned to the remaining elements of the combine harvester 10 based on their at least approximately known frequencies and/or the position of the respective sensor. This means that, after step 104, the computer 46 has available the frequency spectra of the four sensors 48, 50, 54 and 56 which are examined successively. A stochastic relation that is at least partially caused by the flow of harvested crop material exists between the maxima caused by the movements of the material conveying and processing elements of the combine harvester 10. The signals of the sensors 48, 50, 54 and 56 consequently can be divided into periodic portions that are caused by the machine (combine harvester 10) and stochastic portions that are caused by the material flow. These portions can be differentiated in the previously described fashion and analyzed separately.

In order to simplify the description, the examination of only one frequency spectrum is shown in FIG. 2, e.g., the frequency spectrum of the sensor 56. The frequency spectra of the other sensors are examined in like manner.

In step 106, the first maximum of the frequency spectrum is located. In the subsequent step 108, it is examined whether the difference between the amplitude of the maximum and a stored comparative value is greater than a first predetermined, stored threshold value (threshold 1). The first threshold value is negative. Consequently, it is determined whether the vibrational amplitude is significantly greater than the comparative value. It is simultaneously determined whether the difference between the amplitude of the maximum and a stored comparative value is lesser than a second stored threshold value (threshold 2). If the amplitude minus the nominal value is greater than the second threshold value, strong vibrations are indicated. If the amplitude minus the nominal value is smaller than the first threshold value, a defective drive of the element is indicated. A defect message is generated in both instances in step 110.

If it is determined in step 108 that the amplitude lies within the nominal range, the next step to be processed is step 112, where it is determined whether the absolute value of the difference between the frequency of the maximum ($f_{max}$) and a stored nominal frequency ($f_{nom}$) is greater than a threshold value. If the actual frequency deviates excessively from the nominal frequency, a defect could have occurred such that a defect message is also generated in step 114. Information regarding which element of the combine harvester 10 is associated with the possible defect can be displayed on the display device 62 in step 110 and step 114 based on the position of the maximum and/or the position of the sensor to which the frequency spectrum causing the defect message corresponds. A lower threshold value and an upper threshold value that differs from the lower threshold value could also be used for the permissible range of deviation from the nominal frequency in step 112 analogous to step 108.

If the maxima are excessively wide, a defect message could also be generated because this indicates a defect in the form of an uneven movement of the elements or a defective drive.

If it is determined in step 112 that the frequency of the maximum corresponds at least approximately to the comparative value, the next step to be processed is step 116, where it is determined whether all maxima have been checked. If this is the case, step 102 is processed again. Otherwise, the next step to be processed is step 118, where the next maximum is located, whereafter step 108 is processed again.

In conclusion, the described monitoring device which is composed of the sensors 48, 50, 52, 54 and 58 and the computer 46 makes it possible to realize a simple monitoring of a combine harvester 10 for elements that do not move as expected and consequently to detect possible defects in timely fashion.

Having described the preferred embodiment, it will become apparent that various modifications can be made without departing from the scope of the invention as defined in the accompanying claims.

What is claimed is:

1. A monitoring device for monitoring the function of a working machine, the monitoring device comprising at least one sensor that generates a sensed signal containing information on the noise caused by at least one movable element of the working machine, wherein a computer that receives the signal of the sensor and generates an output signal value based on the sensed signal delivered by the sensor and a comparative value, wherein the sensed signal of the sensor contains information on the noise caused by a driven element of the working machine where the movable element is a material conveying element, the computer assigns the sensed signal from the sensor to the movable element of the working machine.

2. A monitoring device as defined by claim 1 wherein the sensor comprises an acoustic sensor.

3. A monitoring device as defined by claim 1 wherein the sensor comprises a motion sensor.

4. A monitoring device as defined by claim 1 wherein the sensor is arranged on a part of the working machine that is directly mechanically in contact with the working element, wherein noise of the working element is mechanically transmitted to the sensor.

5. A monitoring device as defined by claim 1 wherein the sensor is arranged on a part of the working machine, wherein noise of the working element is acoustically transmitted to the sensor.

6. A monitoring device as defined by claim 1 wherein the computer generates a defect message if a parameter of the sensed signal of the sensor, deviates from the comparative value by more than a threshold value.

7. A monitoring device as defined by claim 6 wherein one parameter of the sensed signal is a frequency, and the computer generates a defect message if the frequency of the sensed signal of the sensor, deviates from the comparative value by more than the threshold value.

8. A monitoring device as defined by claim 6 wherein one parameter of the sensed signal is an amplitude, and the computer generates a defect message if the amplitude of the sensed signal of the sensor, deviates from the comparative value by more then the threshold value.

9. A monitoring device as defined by claim 6 wherein the comparative value corresponds to a flawless working machine.

10. A monitoring device as defined by claim 6 wherein the comparative value corresponds to a defective working machine.

11. A monitoring device as defined by claim 1 wherein the computer assigns the sensed signal to the movable element of the working machine based on the position of the sensor in the working machine.

12. A monitoring device as defined by claim 1 wherein the computer assigns the sensed signal to the movable element of the working machine based on a parameter of the sensed signal of the sensor.

13. A monitoring device as defined by claim 1 wherein the computer receive signals from a rotational speed sensor that is assigned to a rotating element of the working machine, and the computer assigns a rotational signal that is related to the rotational speed measured by the rotational speed sensor to the rotating element.

14. A monitoring device as defined by claim 1 wherein the computer is designed for outputting information identifying to which moveable element a defect is associated.

15. A monitoring device as defined by claim 1 wherein the comparative value of the sensed signal of the sensor is recorded and stored by the computer.

16. An agricultural working machine for performing an agricultural operation, the agricultural working machine comprising:

a frame;

wheels supporting the frame;

a moveable element;

an operator's cab from which the harvesting machine is controlled;

monitoring device comprising at least one sensor that generates a sensed signal containing information on the noise caused by the movable element of the agricultural working machine, wherein a computer that receives the signal of the sensor and generates an output signal value based on the sensed signal delivered by the sensor and a comparative value, wherein the sensed signal of the sensor contains information on the noise caused by a driven element of the working machine where the movable element is a material processing element, the computer assigns the sensed signal from the sensor to the movable element of the working machine.

* * * * *